J. W. KELLY.
ADJUSTABLE REAR SEAT FOR BICYCLES.
APPLICATION FILED DEC. 20, 1913.

1,144,550.

Patented June 29, 1915.

WITNESSES:
A. J. Riedel
Raymond King

INVENTOR
James W. Kelly
BY
Luther V. Moulton
ATTORNEY

THE NORRIS PETERS CO., PHOTO-LITHO., WASHINGTON, D. C.

UNITED STATES PATENT OFFICE.

JAMES W. KELLY, OF BAY CITY, MICHIGAN.

ADJUSTABLE REAR SEAT FOR BICYCLES.

1,144,550.　　　　　Specification of Letters Patent.　　Patented June 29, 1915.

Application filed December 20, 1913.　Serial No. 807,852.

*To all whom it may concern:*

Be it known that I, JAMES W. KELLY, a citizen of the United States of America, residing at Bay City, in the county of Bay and State of Michigan, have invented certain new and useful Improvements in Adjustable Rear Seats for Bicycles; and I do hereby declare the following to be a full, clear, and exact description of the invention, such as will enable others skilled in the art to which it appertains to make and use the same.

My invention relates to adjustable rear seats for bicycles, and its object is to provide such a seat, which has a foot support projecting from one side thereof, with means by which the seat may be rotated so that the said foot support will project from either the right or left side of the vehicle, or from the rear thereof; to provide means for retaining the seat in its adjusted position; to provide an improved spring support for the seat, and to embody in the device various novel features of construction and arrangement as is hereinafter more fully described and particularly pointed out in the claims, reference being had to the accompanying drawings, in which:—

Figure 1:
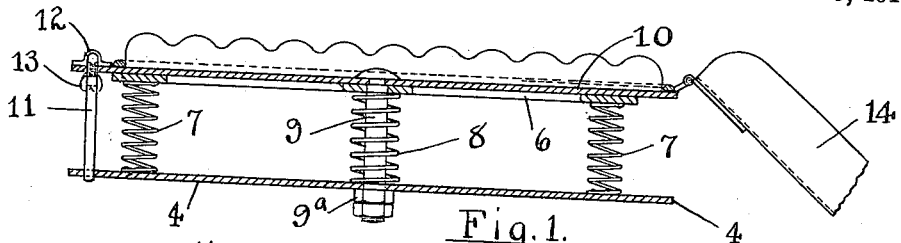
Figures 2, 3:
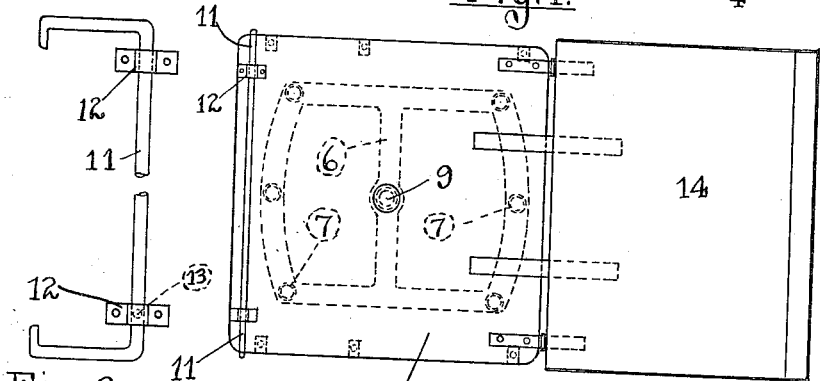
Figure 4:
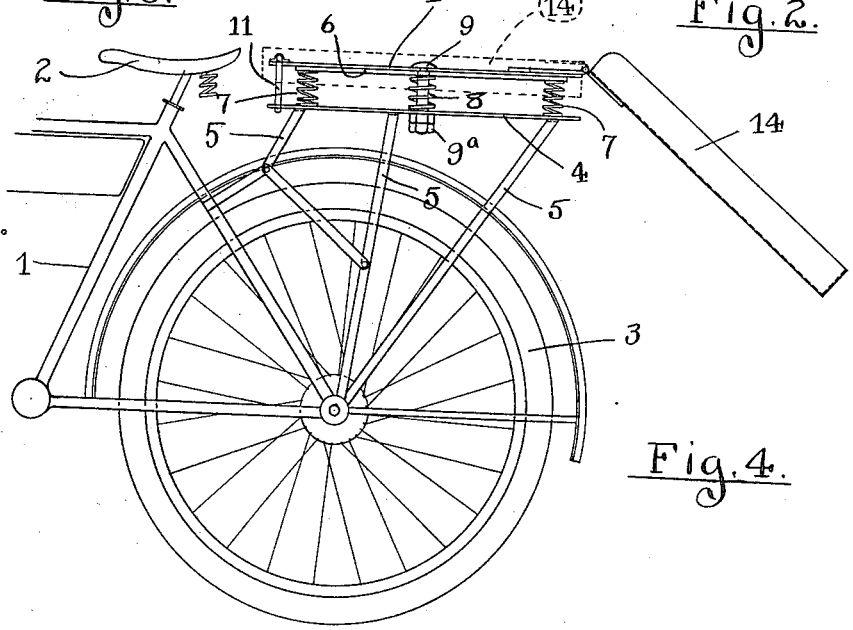

Figure 1 is a sectional elevation of a rear seat embodying my invention; Fig. 2 is a reduced plan view of the same; Fig. 3 is an enlarged detail of the seat retaining device; and Fig. 4 is an elevation of the rear part of a bicycle showing my newly invented seat applied thereto.

Like numbers refer to like parts in all of the figures.

1 represents the frame of a bicycle having the ordinary saddle 2 and rear wheel 3.

The seat embodying this invention comprises a non-rotatable base 4 supported over the rear wheel and behind the saddle 2 by the brackets 5. A non-rotatable seat support 6 is located above the base 4 and is supported and spaced away from the base by the springs 7 and 8. The rotatable seat 10 rests upon the seat support 6 and is rotatably attached thereto by a centrally located pivot bolt 9 which extends through the support 6 and also through the base 4, being provided beneath the base with nuts 9ª to limit its upward movement. The supporting spring 8 surrounds the bolt 9, while the springs 7 are spaced substantially equidistant from the center and support the edges of the seat support 6.

A retainer 11, consisting of a bar bent into substantially inverted U shape having its ends inturned, is pivotally attached by bearing blocks 12 to the rotatable seat 10, and its ends extend downward and embrace the non-rotatable rectangular base 4, the inturned portions extending under the same. A set screw 13 provided in one of the bearing blocks may be tightened to hold the retainer in operative position.

On one edge of the seat, preferably the one opposite that on which the retainer 11 is mounted, is provided a foot support 14 which extends downward and preferably outwardly inclined from the said seat. This foot support may be of any convenient style, the one shown being pivotally connected to the seat and adapted, when not in use, to be folded over the same and when so folded its sides will embrace the sides of the seat and form a compact arrangement presenting a smooth upper surface which may be used as a luggage carrier, the packages to be carried being strapped or otherwise fastened upon said inverted foot support.

The user of this seat may adjust it to the most desirable position, *i. e.* with the foot support 14 extending from either the right or left side of the bicycle or from the rear thereof, by first loosening the set screw 13 and then turning the retainer 11 upward until it disengages the base 4. The seat 10 may then be rotated about the pivot 9 upon the seat support 6 to the desired position, whereat the retainer 11 is again lowered to embrace the base 4 and the set screw 13 tightened to retain it in operative position. When in use, the springs 7 and 8 which support the seat are free to be compressed under the weight of the rider as the center bolt 9 will slide freely through the base 4 and the retainer 11 will likewise move vertically astride of said base.

This seat is more particularly adapted for use on motorcycles as an extra passenger is more frequently carried on these than on the ordinary manually propelled bicycle, but it may be used with equal efficiency upon the common bicycle if so desired.

What I claim is:—

1. An adjustable seat, comprising a fixed base, a non-rotatable support carried on springs above the base, a foot support projecting from one side of the seat and pivoted to the same, and also adapted to fold over the seat to cover the same, and means for retaining the seat in fixed relation to its support.

2. An adjustable seat, comprising a fixed rectangular base, a seat rotatably supported by the base and a retainer comprising a U shaped member pivotally attached to the seat and adapted to embrace the rectangular base.

3. An adjustable seat, comprising a fixed rectangular base, a seat support above the base, springs interposed between the support and base and attached at their respective ends to the same, a rotatable seat on the support, a foot support on one side of the seat, a centrally located pivot bolt extending through the seat and support and vertically slidable through the base, a retainer comprising an inverted U shaped member pivoted on the seat and adapted to loosely embrace the base, and means for releasably holding the retainer in operative position.

In testimony whereof I affix my signature in presence of two witnesses.

JAMES W. KELLY.

Witnesses:
FRANK C. GEARMAN,
EDWARD R. MONROE.

Copies of this patent may be obtained for five cents each, by addressing the "Commissioner of Patents, Washington, D. C."